(12) United States Patent
Yoshitake et al.

(10) Patent No.: US 10,025,246 B2
(45) Date of Patent: Jul. 17, 2018

(54) SILICONE RUBBER-FLUORORESIN LAMINATE

(71) Applicant: NOK Corporation, Tokyo (JP)

(72) Inventors: Isao Yoshitake, Kanagawa (JP); Toshihiro Higashira, Kanagawa (JP); Katsumi Abe, Kanagawa (JP)

(73) Assignee: NOK Corporation, Tokyo (JP)

( * ) Notice: Subject to any disclaimer, the term of this patent is extended or adjusted under 35 U.S.C. 154(b) by 238 days.

(21) Appl. No.: 14/916,313

(22) PCT Filed: Sep. 3, 2014

(86) PCT No.: PCT/JP2014/073201
§ 371 (c)(1),
(2) Date: Mar. 3, 2016

(87) PCT Pub. No.: WO2015/033963
PCT Pub. Date: Mar. 12, 2015

(65) Prior Publication Data
US 2016/0216655 A1    Jul. 28, 2016

(30) Foreign Application Priority Data

Sep. 3, 2013  (JP) ................................ 2013-182287

(51) Int. Cl.
*G03G 15/20*  (2006.01)
*B32B 7/12*  (2006.01)
(Continued)

(52) U.S. Cl.
CPC ............ *G03G 15/206* (2013.01); *B32B 1/08* (2013.01); *B32B 7/12* (2013.01); *B32B 25/08* (2013.01);
(Continued)

(58) Field of Classification Search
CPC ................................................ Y10T 428/3154
See application file for complete search history.

(56) References Cited

U.S. PATENT DOCUMENTS 5,561,511 A * 10/1996 Mizunuma ......... G03G 15/2057
219/469
5,998,034 A * 12/1999 Marvil ............... B29D 99/0035
156/322
(Continued)

FOREIGN PATENT DOCUMENTS

| JP | 61-250668 | 11/1986 |
|---|---|---|
| JP | 02-247674 | 10/1990 |

(Continued)

OTHER PUBLICATIONS

International Search Report from corresponding PCT application No. PCT/JP2014/073201 dated Nov. 25, 2014 (4 pgs).
(Continued)

*Primary Examiner* — Nicole M Buie-Hatcher
(74) *Attorney, Agent, or Firm* — Brinks Gilson & Lione

(57) ABSTRACT

A silicone rubber-fluororesin laminate comprising a substrate, and a vulcanized silicone rubber layer and a fluororesin layer that are sequentially formed on the substrate; wherein the fluororesin layer is formed after an epoxy resin-containing silane based primer layer and a fluororesin based primer layer are sequentially formed on the vulcanized silicone rubber layer, and the epoxy resin-containing silane based primer layer contains 30 to 80 wt % of an epoxy resin and 70 to 20 wt % of a silane coupling agent. The silicone rubber-fluororesin laminate does not cause a reduction not only in the initial adhesion, but also in the adhesion between the vulcanized silicone rubber and the fluororesin even in a heated environment, such as a hot state or long-term heating.

11 Claims, 1 Drawing Sheet

(51) Int. Cl.
*B32B 27/30* (2006.01)
*B32B 27/32* (2006.01)
*B32B 1/08* (2006.01)
*B32B 27/38* (2006.01)
*B32B 25/08* (2006.01)
*B32B 25/20* (2006.01)

(52) U.S. Cl.
CPC ............ *B32B 25/20* (2013.01); *B32B 27/304* (2013.01); *B32B 27/322* (2013.01); *B32B 27/38* (2013.01); *G03G 15/2057* (2013.01); *B32B 2250/02* (2013.01); *B32B 2250/24* (2013.01); *B32B 2255/10* (2013.01); *B32B 2255/26* (2013.01); *B32B 2255/28* (2013.01); *B32B 2307/306* (2013.01); *B32B 2307/308* (2013.01); *B32B 2559/00* (2013.01); *B32B 2597/00* (2013.01)

(56) References Cited

U.S. PATENT DOCUMENTS

| | | | | |
|---|---|---|---|---|
| 6,111,221 | A * | 8/2000 | Miyakoshi | C08F 283/12 219/216 |
| 2007/0054077 | A1* | 3/2007 | Barrese | B32B 7/12 428/35.7 |
| 2010/0104335 | A1 | 4/2010 | Kamimura et al. | |
| 2011/0217529 | A1* | 9/2011 | Qi | B05D 5/12 428/216 |
| 2013/0259548 | A1* | 10/2013 | Matsumoto | G03G 15/2057 399/333 |

FOREIGN PATENT DOCUMENTS

| | | |
|---|---|---|
| JP | 06-248116 | 9/1994 |
| JP | 10-091024 | 4/1998 |
| JP | 10-142988 | 5/1998 |
| JP | 2004-059796 | 2/2004 |
| JP | 2004-276290 | 10/2004 |
| WO | WO 2004/018201 A1 | 3/2004 |
| WO | WO 2008/126915 A1 | 10/2008 |

OTHER PUBLICATIONS

International Preliminary Report on Patentability and Written Opinion from corresponding PCT application No. PCT/JP2014/073201 dated Mar. 25, 2016 (6 pgs).

* cited by examiner

[Fig. 1]
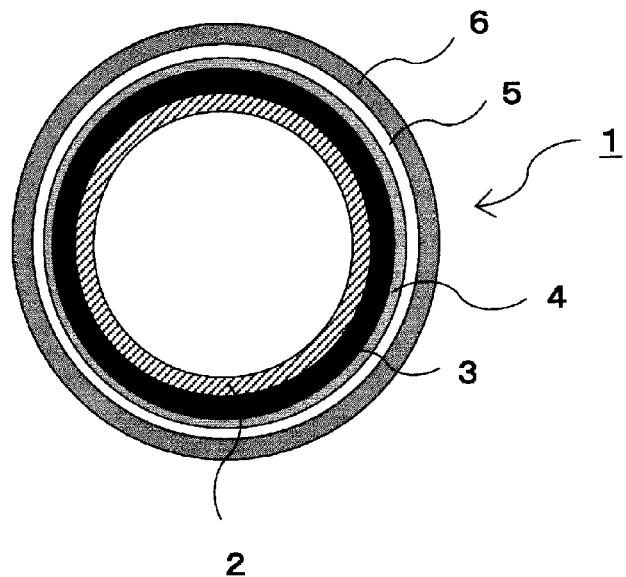
[Fig. 2]
(PRIOR ART)
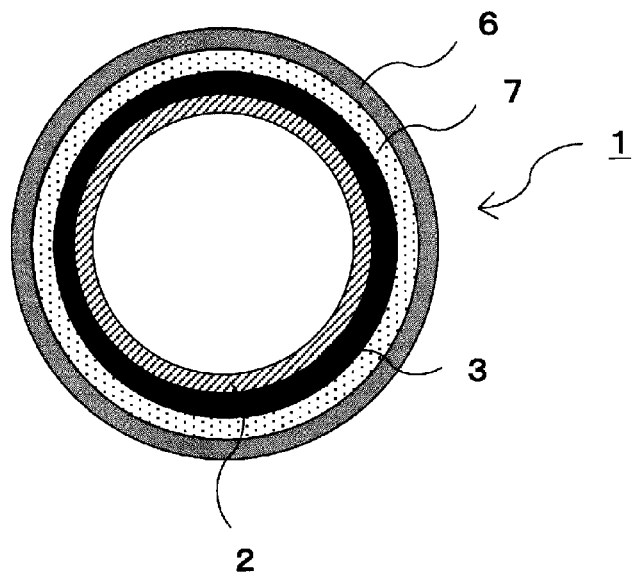

SILICONE RUBBER-FLUORORESIN LAMINATE

RELATED APPLICATION

This application is a 35 U.S.C. § 371 national phase filing of International Patent Application No. PCT/JP2014/073201, filed Sep. 3, 201, through which and to which priority is claimed under 35 U.S.C. § 119 to Japanese Patent Application No. 2013-182287, filed Sep. 3, 2013, the entire disclosure of which is hereby expressly incorporated by reference.

TECHNICAL FIELD

The present invention relates to a silicone rubber-fluororesin laminate. More particularly, the present invention relates to a silicone rubber-fluororesin laminate that is used in toner fixing members of copying machines, etc.

BACKGROUND ART

In general, in a toner fixing member 1 (e.g., a fixing roll or a fixing belt) used in a copying machine, and the like, a layer 3 comprising an elastic body (e.g., rubber) is formed on a cylindrical substrate 2, and a fluororesin layer 6 (e.g., tetrafluoroethylene-perfluoroalkyl vinyl ether copolymer resin [PFA] or polytetrafluoroethylene resin [PTFE]) is further formed as the surface layer on the elastic layer 3 via an adhesive layer 7, as shown in FIG. 2.

Various toner fixing members, such as fixing rolls and fixing belts, are proposed. For example, Patent Document 1 proposes a (silicone) rubber-fluororesin laminate formed by bonding a rubber layer, such as silicone based rubber, to the surface of a cylindrical substrate via an adhesive for rubber layer, and further bonding tubular PFA to the rubber layer using an adhesive, such as a silicone based adhesive or an imide based adhesive.

Such a toner fixing member is required to have a thinner fluororesin layer in terms of toner fixing properties; however, there were problems in that the inner surface treatment of thinner tubular fluororesin was difficult, and the adhesion of the thinner tubular fluororesin with an elastic layer was poor.

To address these problems, Patent Documents 2 to 5 propose various silicone rubber-fluororesin laminates, including laminates provided with an undercoat agent layer and/or a primer layer between an elastic body layer and a fluororesin layer.

Patent Document 2 proposes a fixing roller and a fixing belt comprising a substrate, and an elastic layer and a surface layer that are sequentially formed on the substrate, wherein the surface layer is formed by heat shrinkage of a PFA tube, and the surface layer and the elastic layer are bonded together by means of an adhesive material containing 20 to 30 wt % of PFA. The fixing roller and fixing belt are low in cost because the inner surface of the PFA tube is not treated. Further, the fixing roller and fixing belt characteristically have a thin primer layer. The surface roughness is small, and the initial adhesion is excellent; however, the hot adhesion and the adhesion after a long-term heating test are not satisfactory, as shown in Comparative Example 5, provided later.

Patent Document 3 proposes a fixing member obtained by applying primer treatment to an elastic layer formed on a cylindrical or columnar substrate using an epoxy based primer, and the like, further forming a fluororesin layer, completely covering the fluororesin layer with a heat shrinkable tube shrunk by heating, and forming a film by heating and baking. The fixing member has a smooth surface with a surface roughness Rz of 5 µm or less; however, the initial adhesion, the hot adhesion, and the adhesion after a long-term heating test are not satisfactory.

Patent Document 4 discloses a fluorine-containing laminate comprising a substrate, a primer layer formed on the substrate, and a molding layer formed on the primer layer, wherein when silicone rubber is selected as heat resistant rubber that forms the substrate, the primer layer comprises a functional group-containing, fluorine-containing ethylenic polymer containing an alkoxysilane monomer polymer (and an organic titanate compound), and the molding layer is formed from a fluorine-containing resin molded product using a heat shrinkable PFA tube. The fluorine-containing laminate also has low surface roughness and excellent initial adhesion; however, the hot adhesion and the adhesion after a long-term heating test are not satisfactory.

Patent Document 5 proposes a heating roller comprising a silicone rubber coating layer provided on a metal hollow core bar, and a thin film made of PFA as the outermost layer, wherein a primer layer with a two-layer structure is inserted between the silicone rubber coating layer and the PFA thin film, and the primer layer has a lower layer comprising a mixture containing a silicone resin and a silane coupling agent as main components, and an upper layer comprising a mixture containing an alkoxy-modified fluororesin as a main component. The heating roller has a uniform film thickness, and has excellent initial adhesion, as well as satisfactory surface roughness and hot adhesion; however, the adhesion after a long-term heating test is not satisfactory.

As for the adhesion, it is known that the addition of metal oxide (e.g., rouge $Fe_2O_3$), which has high activity and many functional groups, to primers can enhance adhesion; however, in some cases, the adhesion is not satisfactory depending on the level of adhesion required for fixing members of copying machines.

Thus, none of these conventionally proposed laminates sufficiently satisfies the hot adhesion and the adhesion after a long-term heating test. This is attributable to the following reason. Silicone rubber and fluororesin are poorly compatible because of their different structures; particularly, there is a tendency in that since reactive functional groups are poor in the vulcanized silicone rubber side, the adhesion of the silicone rubber side is low.

Therefore, even if a fluorine based primer is used, the fluororesin and the primer are bonded together by heat melting; on the contrary, the adhesion with the silicone rubber is reduced. As a result, the fluororesin and the silicone rubber initially seem to be bonded together; however, the adhesion may be reduced in a heated environment, such as a hot state or long-term heating. Furthermore, the surface of the vulcanized silicone rubber is in an inactive state, and low molecular weight components that inhibit adhesion are present on the rubber surface; the adhesion between the primer and the rubber may be deteriorated.

PRIOR ART DOCUMENTS

Patent Documents

Patent Document 1 JP-A-2004-276290
Patent Document 2 WO2008/126915
Patent Document 3 JP-A-10-142988
Patent Document 4 WO2004/18201

Patent Document 5 JP-A-61-250668
Patent Document 6 JP-A-6-248116

OUTLINE OF THE INVENTION

Problem to be Solved by the Invention

An object of the present invention is to provide a silicone rubber-fluororesin laminate that does not cause a reduction not only in the initial adhesion, but also in the adhesion between the vulcanized silicone rubber and the fluororesin even in a heated environment, such as a hot state or long-term heating.

Means for Solving the Problem

The above object of the present invention can be achieved by a silicone rubber-fluororesin laminate comprising a substrate, and a vulcanized silicone rubber layer and a fluororesin layer that are sequentially formed on the substrate; wherein the fluororesin layer is formed after an epoxy resin-containing silane based primer layer and a fluororesin based primer layer are sequentially formed on the vulcanized silicone rubber layer, and the epoxy resin-containing silane based primer layer contains 30 to 80 wt % of an epoxy resin and 70 to 20 wt % of a silane coupling agent.

Effect of the Invention

The silicone rubber-fluororesin laminate of the present invention has the following excellent effects. Since an epoxy resin-containing silane based primer layer containing an epoxy resin and a silane coupling agent at a predetermined ratio is formed on silicone rubber, the epoxy resin-containing silane based primer layer is reacted with the vulcanized silicone rubber, and further the silane coupling agent is reacted with the fluororesin primer. Moreover, due to the addition of an epoxy resin, the adhesion between the silicone rubber and the fluororesin in a hot state can be increased.

Furthermore, since the fluororesin based primer is melted and bonded to the fluororesin due to heat melting of a PFA tube by heating, there is no variation in adhesive strength depending on the specification of the vulcanized silicone rubber. Consequently, the resulting product has stable adhesive strength.

BRIEF DESCRIPTION OF DRAWINGS

FIG. 1: An example of the cross-sectional view of a fixing roll comprising the silicone rubber-fluororesin laminate of the present invention.

FIG. 2: An example of the cross-sectional view of a fixing roll comprising a conventional silicone rubber-fluororesin laminate according to a prior art.

EMBODIMENTS FOR CARRYING OUT THE INVENTION

The substrate can be a metal substrate made of stainless steel, iron, aluminum, or the like; or a heat resistant resin substance made of polyamide resin, polyimide resin, or the like. The substrate of a fixing roll is preferably stainless steel, iron, aluminum, or the like. The substrate of a fixing belt is preferably a metal belt produced by electroforming molding, electroformed nickel, polyimide resin, or the like. Such a substrate generally has a thickness of about 10 to 100 µm. Moreover, a substrate used as a fixing roll has a cylindrical shape, and a substrate used as a fixing belt has an endless belt shape. The fixing member as mentioned herein refers to a fixing roll or a fixing belt, both of which are used in a toner fixing part of a copying machine, and the like.

As the silicone rubber, dimethyl silicone rubber, methylphenyl silicone rubber, fluorosilicone rubber, vinyl silicone rubber, and the like are used. A silicone rubber layer generally having a thickness of about 50 µm to 1 mm, preferably about 100 to 500 µm, is formed on the substrate. The silicone rubber vulcanized by heating or other means has such a heat resistance that it can withstand continuous use at a fixing temperature, for toner and the like.

On the silicone rubber layer, first, an epoxy resin-containing silane based primer layer containing 30 to 80 wt % of an epoxy resin and 70 to 20 wt % of a silane coupling agent is formed.

Examples of epoxy resins include compounds obtained by a reaction of epichlorohydrin with bisphenol A, bisphenol F, bisphenol AF, novolak resin, or the like, and various derivatives obtained from these compounds. Specific examples of derivatives of such compounds include at least one member selected from bisphenol A type epoxy resins, bisphenol A type brominated epoxy resins, bisphenol F type epoxy resins, bisphenol AF type epoxy resins, bisphenol AD type epoxy resins, DPP novolak type epoxy resins, phenol novolak type epoxy resins, cresol novolak type epoxy resins, etc.; preferably a mixture of a cresol novolak type epoxy resin or a bisphenol A type epoxy resin with a phenol novolak type epoxy resin. Such an epoxy resin is used as an emulsion type, which is an aqueous dispersion, or as an organic solvent such as acetone or methyl ethyl ketone solution or dispersion. Commercially available epoxy resins produced by DIC, such as Epiclon N-665, N-670, N-673, N-695, 840, 850, 860, 1055, 2050, N-730A, N-740, N-865, N-775, N-665-EXP-S, and 850-LC, can be used as they are.

Examples of silane coupling agents include vinyl group-containing silane coupling agents, epoxy group-containing silane coupling agents, methacryloxy group-containing silane coupling agents, amino group-containing silane coupling agents, chloro group-containing silane coupling agents, mercapto group-containing silane coupling agents, and the like. Specific examples thereof include at least one member selected from vinyltrichlorosilane, vinyltriethoxysilane, vinyltris(β-methoxy-ethoxy)silane, β-(3,4-epoxycyclohexylethyl)trimethoxysilane, γ-glycidoxypropyltrimethoxysilane, γ-methacryloxypropyltrimethoxysilane, γ-aminopropyltriethoxysilane, 3-aminopropyltriethoxysilane, 3-aminopropyltrimethoxysilane, N-β-(aminoethyl)-γ-aminopropyltrimethoxysilane, N-β-(aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, bis[3-(triethoxysilyl)propyl]tetrasulfide; and the tetrasulfides described in Patent Document 6, such as γ-trimethoxysilylpropyldimethylthiocarbamyl tetrasulfide and γ-trimethoxysilylpropylbenzothiazyl tetrasulfide. Preferably used is a silane compound represented by the following formula [I] or [II]:

$$X_n Si(OR)_{4-n} \quad [\text{I}]$$

R: an alkyl group having 1-3 carbon atoms
X: 3-aminopropyl group, N-β-(aminoethyl)-γ-aminopropyl group, N-phenyl-3-aminopropyl group, 3-methacryloxypropyl group, 3-glycidoxypropyl group, 3-mercaptopropyl group, vinyl group etc.
n: an integer of 1 to 3

$$R^1{}_m(R^2)_n\text{—Si—}R^3{}_{4-m-n} \quad [\text{II}]$$

m and n: an integer of 0 to 4

$R^1$: an alkyl group having 10 or less carbon atoms $R^2$: an alkoxy group having 10 or less carbon atoms $R^3$: a methacryloxyalkyl group having 10 or less carbon atoms The epoxy resin and the silane coupling agent are used so that, in terms of the solid matters content of the epoxy resin-containing silane based primer component comprising these components, the ratio of the epoxy resin is 30 to 80 wt %, preferably 40 to 70 wt %, and the ratio of the silane coupling agent is 70 to 20 wt %, preferably 60 to 30 wt %. When the ratio of the epoxy resin is less than this range, the hot adhesion, adhesion after a long-term heating test, fixing properties, etc., are deteriorated. In contrast, when the ratio of the silane coupling agent is less than this range, the adhesion after a long-term heating test, fixing properties, and the like, are deteriorated.

The method for coating the epoxy resin-containing silane based primer on the silicone rubber is not particularly limited. Examples of the coating method include dipping, spraying, roll coating, doctor blade coating, flow coating, etc. The drying conditions after coating can be suitably determined. For example, drying is performed under conditions of room temperature to about 150° C. for about 5 to 30 minutes. Thus, a primer layer having a thickness of about 1 to 10 µm, preferably about 1 to 5 µm, is formed.

The silane coupling agent also acts as an epoxy resin curing agent. In addition, imidazoles and rapidly curable mercaptans can also be used as the epoxy resin curing agent. Examples of the imidazoles include 2-methylimidazole, 2-ethyl-4-methylimidazole, 2-undecylimidazole, 2-heptadecylimidazole, 2-phenylimidazole, 1-benzylimidazole, 1-benzyl-2-methylimidazole, 2,4-diamino-6-[2-methylimidazoline-(1)]-ethyl-s-triazine, etc.

As the fluororesin based primer, an aqueous dispersion of a fluororesin is generally used. Other usable examples include fluororesins to which a mixture of phosphoric acid and chromic acid is added, fluororesins to which a trifluorovinyl ether group-containing phosphoric acid ester compound, polyether sulfone resin, polyamide imide resin, polyimide resin, polyphenylene sulfide resin, organic titanate, etc. is added, and reactive functional group-containing fluororesins. Examples of the organic titanate used herein include alkoxy titanium, titanium acylate, and titanium chelate, all of which have a Ti—O—C bond and are formed from Ti(IV) or Ti(III) and a compound having an alcoholic hydroxyl group, a phenolic hydroxyl group, or a carboxyl group. Using such a fluororesin based primer increases the adhesion between the epoxy resin-containing silane based primer and PFA. Commercially available primers, such as PL-992CL and PL-990CL (produced by DuPont-Mitsui Polychemicals Co. Ltd.), can be used.

Here, the fluororesin used in the primer layer in order to increase the adhesion with the epoxy resin-containing silane based primer layer is preferably a fluororesin having at least partially a functional group, such as a carboxylic acid group or a derivative thereof, a hydroxyl group, a nitrile group, a cyanate group, a carbamoyloxy group, a phosphonooxy group, a halo-phosphonooxy group, a sulfone group or a derivative thereof, or a sulfohalide group. Specific example of the functional group used herein include —COOH, —CH$_2$COOH, —COOCH$_3$, —CONH$_2$, —OH, —CH$_2$OH, —CN, —CH$_2$O(CO)NH$_2$, —CH$_2$OCN, —CH$_2$OP(O)(OH)$_2$, —CH$_2$P(O)Cl$_2$, —SO$_2$F, and the like.

The fluororesin having such a functional group contains a functional group within a range that does not significantly impair the properties of a heat melting fluororesin. The fluororesin having a functional group can be obtained by introducing a functional group by addition or substitution after the synthesis of a heat melting fluororesin or by copolymerizing a monomer having a functional group during the synthesis of a heat melting fluororesin, preferably by copolymerizing a monomer having a functional group during the synthesis of a heat melting fluororesin.

The fluororesin based primer is prepared as an aqueous dispersion, an organic solvent dispersion, and the like. Such a dispersion is applied to the epoxy resin-containing silane based primer layer to a thickness of about 1 to 20 µm, preferably about 1 to 10 µm, by any coating method, such as dipping, spraying, roll coating, doctor blade coating, or flow coating. When the coating thickness is higher than this range, irregularities are formed on the surface, and heat conductivity is reduced. In contrast, a coating thickness lower than this range is not preferable, because the epoxy resin-containing silane based primer layer may be exposed, and heat melting with a PFA tube becomes difficult, resulting in poor adhesion.

When the fluororesin based primer is used as an aqueous dispersion, the fluororesin concentration is preferably about 10 to 20 wt %. When the concentration is lower than this range, large coating unevenness occurs. In contrast, when the concentration is higher than this range, the irregularities of the coating after drying become larger. The drying conditions after coating can be suitably determined. For example, drying is performed under the conditions of room temperature to about 150° C. for about 5 to 30 minutes.

On the fluororesin based primer layer, a heat melting fluororesin is laminated, followed by baking at a temperature equal to or higher than the melting point of the fluororesin, for example, at about 260 to 350° C., preferably about 270 to 330° C., for about 10 to 80 minutes, preferably about 20 to 60 minutes. When the baking temperature is lower than the melting point of the fluororesin, the fluororesin based primer and the fluororesin, which is generally used in a tubular shape, are not heat-sealed, causing adhesion failure. In contrast, when the temperature is higher than this range, the silicone rubber is thermally degraded. Further, when the baking time is shorter than this range, insufficient melting of the PFA tube may cause poor adhesion with the fluororesin based primer layer. In contrast, when the baking time is longer than this range, the silicone rubber may be thermally degraded.

Examples of the heat melting fluororesin include polymers or copolymers of tetrafluoroethylene, hexafluoropropylene, perfluoro(alkyl vinyl ether), vinylidene fluoride, and vinyl fluoride; copolymers of such monomers and ethylene; and the like. These monomers can be used singly or as a mixture of two or more.

Specific examples thereof include polytetrafluoroethylene [PTFE], tetrafluoroethylene-perfluoro(alkyl vinyl ether) copolymer [PFA], tetrafluoroethylene-hexafluoropropylene copolymer [FEP], tetrafluoroethylene-ethylene copolymer, tetrafluoroethylene-hexafluoropropyl ene-perfluoro(alkyl vinyl ether) copolymer, polyvinylidene fluoride, polyvinyl fluoride, polychlorotrifluoroethylene, chlorotrifluoroethylene-ethylene copolymer, and combinations of two or more of these. A tetrafluoroethylene copolymer is preferred in terms of the thermal degradation temperature of the elastic body and the film forming properties. PFA or FEP, both of which have a melting point lower than that of PTFE, used, for example, as a heat shrinkable PFA tube having a thickness of about 5 to 20 µm.

The silicone rubber-fluororesin laminate having the above structure can not only be a planar laminate, but also be a fixing member 1 in the form of a tubular laminate, as shown in FIG. 1, in which a silicone rubber layer 3, an epoxy resin-containing silane based primer layer 4, a fluororesin based primer layer 5, and a fluororesin layer 6 are sequentially formed on a cylindrical substrate 2.

EXAMPLES

The following describes the present invention with reference to Examples.

Example 1

A cylindrical nickel belt having an inner diameter of 40 mm, a thickness of 30 and a length of 410 mm used as a substrate was coated with a silane based adhesive for elastic layers (DY39-042, produced by Dow Corning Toray Co., Ltd.). Further, silicone rubber (X34-2008, produced by Shin-Etsu Silicone Co., Ltd.) was applied thereon using a dispenser to form a silicone rubber layer having a thickness of 100 μm. The silicone rubber layer was vulcanization-molded by heat treatment.

The silicone rubber layer was coated by spraying with the following epoxy resin-containing silane based primer. The resulting product was allowed to stand for several minutes at ordinary temperature to volatilize the solvent, thereby forming an epoxy resin-containing silane based primer layer having a thickness of 2 μm.

| | |
|---|---|
| Cresol novolak type epoxy resin (N-695, produced by DIC) | 2.91 parts by weight (46.9 wt %) |
| 3-aminopropyltriethoxysilane | 3.00 parts by weight (48.3 wt %) |
| Vinyltriethoxysilane | 0.30 parts by weight (4.8 wt %) |
| Methyl ethyl ketone | 3.09 parts by weight |
| Toluene | 30.00 parts by weight |
| Butyl acetate | 20.00 parts by weight |

Subsequently, the epoxy resin-containing silane based primer layer was coated by spraying with a fluororesin based primer (solid matters content: 16.5 wt %) prepared using 66 parts by weight of fluororesin (25 wt % aqueous solution of PFA; PL-992CL, produced by DuPont-Mitsui Polychemicals Co., Ltd.) and 34 parts by weight of water. The primer was dried under room temperature conditions to form a fluororesin based primer layer having a thickness of 2 μm. Then, a heat shrinkable PFA tube (produced by Gunze) having a thickness of 10 μm, which was not subjected to inner surface treatment, was melted and coated at 330° C. for 60 minutes, thereby obtaining a cylindrical silicone rubber-fluororesin laminate.

Example 2

In Example 1, among the components of the epoxy resin-containing silane based primer as the lower layer, the amount of cresol novolak type epoxy resin was changed to 4.37 parts by weight (55.2 wt %), the amount of 3-aminopropyltriethoxysilane was changed to 3.3 parts by weight (41.7 wt %), the amount of vinyltriethoxysilane was changed to 0.25 parts by weight (3.2 wt %), and the amount of methyl ethyl ketone was changed to 4.64 parts by weight.

Example 3

In Example 1, among the components of the epoxy resin-containing silane based primer as the lower layer, the amount of cresol novolak type epoxy resin was changed to 5.34 parts by weight (66.8 wt %), the amount of 3-aminopropyltriethoxysilane was changed to 2.5 parts by weight (31.3 wt %), the amount of vinyltriethoxysilane was changed to 0.15 parts by weight (1.9 wt %), and the amount of methyl ethyl ketone was changed to 5.67 parts by weight.

Example 4

In Example 1, among the components of the epoxy resin-containing silane based primer as the lower layer, the amount of cresol novolak type epoxy resin was changed to 4.37 parts by weight (53.5 wt %), the amount of 3-aminopropyltriethoxysilane was changed to 3.3 parts by weight (40.4 wt %), the amount of vinyltriethoxysilane was changed to 0.5 parts by weight (6.1 wt %), and the amount of methyl ethyl ketone was changed to 4.64 parts by weight.

Example 5

In Example 1, among the components of the epoxy resin-containing silane based primer as the lower layer, the amount of cresol novolak type epoxy resin was changed to 4.37 parts by weight (40.2 wt %), the amount of 3-aminopropyltriethoxysilane was changed to 5.5 parts by weight (50.6 wt %), the amount of vinyltriethoxysilane was changed to 1.0 part by weight (9.2 wt %), and the amount of methyl ethyl ketone was changed to 4.64 parts by weight.

Example 6

In Example 1, among the components of the epoxy resin-containing silane based primer as the lower layer, the amount of cresol novolak type epoxy resin was changed to 4.37 parts by weight (57.0 wt %), the amount of 3-aminopropyltriethoxysilane was changed to 3.3 parts by weight (43.0 wt %), the amount of methyl ethyl ketone was changed to 4.64 parts by weight, and vinyltriethoxysilane was not used.

Comparative Example 1

In Example 1, among the components of the epoxy resin-containing silane based primer as the lower layer, the amount of cresol novolak type epoxy resin was changed to 1.0 part by weight (20.0 wt %), the amount of 3-aminopropyltriethoxysilane was changed to 3.5 parts by weight (70.0 wt %), the amount of vinyltriethoxysilane was changed to 0.5 parts by weight (10.0 wt %), and the amount of methyl ethyl ketone was changed to 1.0 part by weight.

Comparative Example 2

In Example 1, among the components of the epoxy resin-containing silane based primer as the lower layer, the amount of cresol novolak type epoxy resin was changed to 7.3 parts by weight (81.1 wt %), the amount of 3-aminopropyltriethoxysilane was changed to 1.4 parts by weight (15.6 wt %), the amount of vinyltriethoxysilane was changed to 0.3 parts by weight (3.3 wt %), and the amount of methyl ethyl ketone was changed to 7.7 parts by weight.

Comparative Example 3

In Example 1, among the components of the epoxy resin-containing silane based primer as the lower layer, the amount of cresol novolak type epoxy resin was changed to 2.4 parts by weight (18.8 wt %), the amount of 3-aminopropyltriethoxysilane was changed to 10 parts by weight (78.1 wt %), the amount of vinyltriethoxysilane was changed to 0.4 parts by weight (3.1 wt %), and the amount of methyl ethyl ketone was changed to 2.6 parts by weight.

Comparative Example 4

In Example 1, among the components of the epoxy resin-containing silane based primer as the lower layer, the amount of cresol novolak type epoxy resin was changed to 4.3 parts by weight (81.1 wt %), the amount of 3-aminopropyltriethoxysilane was changed to 0.9 parts by weight (17.0 wt %), the amount of vinyltriethoxysilane was changed to 0.1 part by weight (1.9 wt %), and the amount of methyl ethyl ketone was changed to 3.7 parts by weight.

Comparative Example 5

In Example 1, only the fluororesin based primer layer as the upper layer was provided, and the epoxy resin-containing silane based primer layer as the lower layer was not provided.

The cylindrical silicone rubber-fluororesin laminates obtained in the above Examples and Comparative Examples were measured for the initial adhesion, surface roughness, hot adhesion, adhesion after a long-term heating test, and fixing properties.

Initial adhesion: A peel test was performed according to JIS K6404-5 (Testing methods for rubber- or plastics-coated fabrics—Part 5: Determination of coating adhesion) corresponding to ISO DIS2411. The fracture surface was observed, and the adhesion was evaluated according to the following criteria:

⊚: Rubber fractured
○: Thin layer rubber fractured
△: Partially peeled
x: Entirely peeled Surface roughness: Ra was measured according to JIS B0651-1976 corresponding to ISO 3274 using Surfcom 1400A (produced by Toyo Seimitsu Co., Ltd.). The results were evaluated as follows:

Ra was 0.2 or less: ○
Ra was more that 0.2 or more: x

Hot adhesion: The adhesion at 170° C. was evaluated by performing the same test as that of the initial adhesion.

Adhesion after long-term heating test: The adhesion at 230° C. after 1,000 hours was evaluated by performing the same test as that of the initial adhesion.

Fixing properties: An image was formed in a fixing device using a fixing belt, and the fixed portion was rubbed. Then, the fixing properties were evaluated according to the following criteria:

○: Excellent printed image and good fixing properties
x: Defective printed image or poor fixing properties The following table shows the obtained results.

TABLE

| Measurement items | Ex. | | | | | | Comp. Ex. | | | | |
|---|---|---|---|---|---|---|---|---|---|---|---|
| | 1 | 2 | 3 | 4 | 5 | 6 | 1 | 2 | 3 | 4 | 5 |
| Initial adhesion | ⊚ | ⊚ | ⊚ | ⊚ | ⊚ | ○ | ○ | ○ | ○ | ○ | ⊚ |
| Surface roughness | ○ | ○ | ○ | ○ | ○ | ○ | x | x | x | x | ⊚ |
| Hot adhesion | ⊚ | ⊚ | ⊚ | ⊚ | ⊚ | ○ | △ | ○ | △ | ○ | x |
| Adhesion after long-term heating test | ⊚ | ⊚ | ⊚ | ⊚ | ⊚ | ○ | △ | △ | △ | △ | △ |
| Fixing properties | ○ | ○ | ○ | ○ | ○ | ○ | x | x | x | x | ○ |

INDUSTRIAL APPLICABILITY

The silicone rubber-fluororesin laminate of the present invention does not cause a reduction in the adhesion between the vulcanized silicone rubber and the fluororesin even in a heated environment, such as a hot state or long-term heating; therefore, when formed into a cylindrical structure, the silicone rubber-fluororesin laminate of the present invention can be effectively used as a toner fixing member, such as a fixing roll or a fixing belt, of a copying machine, etc.

REFERENCE SIGN LIST

1: Fixing member
2: Substrate
3: Silicone rubber layer
4: Epoxy resin-containing silane based primer layer
5: Fluororesin based primer layer
6: Fluororesin layer
7: Adhesive layer

The invention claimed is:

1. A silicone rubber-fluororesin laminate comprising a substrate, and a vulcanized silicone rubber layer and a fluororesin layer that are sequentially formed on the substrate; wherein the fluororesin layer is formed after an epoxy resin-containing silane based primer layer and a fluororesin based primer layer are sequentially formed on the vulcanized silicone rubber layer, and the epoxy resin-containing silane based primer layer contains 30 to 80 wt % of an epoxy resin and 70 to 20 wt % of a silane coupling agent.

2. The silicone rubber-fluororesin laminate according to claim 1, wherein the silane coupling agent is 3-aminopropyltriethoxysilane, vinyltriethoxysilane, or a mixture thereof.

3. A silicone rubber-fluororesin laminate toner fixing member for a copying machine which comprises the silicone rubber-fluororesin laminate according to claim 2.

4. In a copying machine having a silicone rubber-fluororesin laminate toner fixing member the improvement wherein the silicone rubber-fluororesin laminate toner fixing member comprises the silicone-fluororesin laminate of claim 2.

5. The silicone rubber-fluororesin laminate according to claim 1, wherein the fluororesin based primer layer is formed from an aqueous dispersion or organic solvent dispersion of a fluororesin, the dispersion having a solid matters content of 10 to 20 wt %.

6. In a copying machine having a silicone rubber-fluororesin laminate toner fixing member the improvement wherein the silicone rubber-fluororesin laminate toner fixing member comprises the silicone-fluororesin laminate of claim 5.

7. A silicone rubber-fluororesin laminate toner fixing member for a copying machine comprising the silicone rubber-fluororesin laminate according to claim 5.

8. The silicone rubber-fluororesin laminate according to claim 1, wherein the fluororesin layer is formed by sequentially forming an epoxy resin-containing silane based primer layer and a fluororesin based primer layer on a substrate, inserting the substrate into a fluororesin tube, and shrinking the tube by heating to 260 to 350° C.

9. In a copying machine having a silicone rubber-fluororesin laminate toner fixing member the improvement wherein the silicone rubber-fluororesin laminate toner fixing member comprises the silicone-fluororesin laminate of claim 8.

10. A silicone rubber-fluororesin laminate toner fixing member for a copying machine comprising the silicone rubber-fluororesin laminate according to claim 8.

11. In a copying machine having a silicone rubber-fluororesin laminate toner fixing member the improvement wherein the silicone rubber-fluororesin laminate toner fixing member comprises the silicone-fluororesin laminate of claim 1.

\* \* \* \* \*

UNITED STATES PATENT AND TRADEMARK OFFICE
CERTIFICATE OF CORRECTION

PATENT NO. : 10,025,246 B2
APPLICATION NO. : 14/916313
DATED : July 17, 2018
INVENTOR(S) : Isao Yoshitake, Toshihiro Higashira and Katsume Abe It is certified that error appears in the above-identified patent and that said Letters Patent is hereby corrected as shown below:

In the Specification

In Column 1, Line 8, "Sep. 3, 201," should be changed to --Sep. 3, 2014--

Signed and Sealed this
Twelfth Day of February, 2019

Andrei Iancu
*Director of the United States Patent and Trademark Office*